Figure 1:
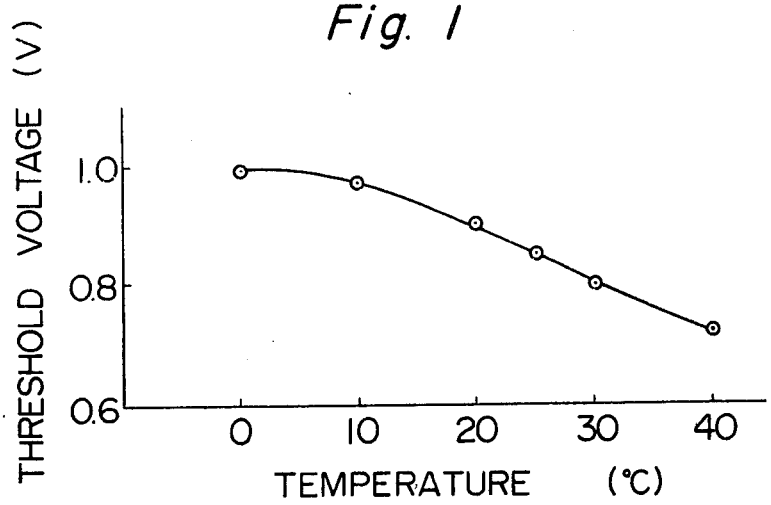

United States Patent [19]

Arai et al.

[11] 4,048,089

[45] Sept. 13, 1977

[54] NEMATIC LIQUID CRYSTAL COMPOSITION

[75] Inventors: Yoshi Arai, Oyama; Kazuo Kimura, Tokyo; Hisato Sato, Tokyo; Takasi Yamaki, Tokyo; Katsuhiko Morita; Masanao Ohzeki, both of Urawa; Haruyoshi Takatsu, Kodaira; Yutaka Fujita, Yokohama; Masayuki Tazume, Urawa, all of Japan

[73] Assignees: Dainippon Ink & Chemicals, Inc., Tokyo; Kawamura Institute of Chemical Research, Saitama, both of Japan

[21] Appl. No.: 702,500

[22] Filed: July 6, 1976

[30] Foreign Application Priority Data

July 31, 1975 Japan .................. 50-92571

[51] Int. Cl.² .......................... C09K 3/34; G02F 1/13
[52] U.S. Cl. .................................... 252/299; 252/408; 350/160 LC
[58] Field of Search ............................. 252/299, 408; 350/160 LC

[56] References Cited

U.S. PATENT DOCUMENTS

| 3,947,375 | 3/1976 | Gray et al. ........................ 252/299 |
| 3,952,046 | 4/1976 | Scherrer et al. ................... 252/299 |
| 3,963,311 | 6/1976 | Boller et al. .................. 350/160 LC |

FOREIGN PATENT DOCUMENTS

| 2,252,132 | 6/1975 | France .................................. 252/299 |
| 2,502,904 | 7/1975 | Germany ............................. 252/299 |
| 2,024,269 | 12/1971 | Germany ............................. 252/299 |
| 5,023,385 | 3/1975 | Japan .................................. 252/299 |

Primary Examiner—Benjamin R. Padgett
Assistant Examiner—T. S. Gron
Attorney, Agent, or Firm—Sherman & Shalloway

[57] ABSTRACT

A nematic liquid crystal composition comprising (I) 4-n-valeryloxy-4'-cyanobiphenyl, (II) 4-n-caproyloxy-4'-cyanobiphenyl and (III) 4'-cyanophenyl-4-n-heptylbenzoate, and either (IV) 4'-cyanophenyl-4-n-butylbenzoate or (V) 4'-cyanophenyl-4-n-nonylbenzoate, said composition having a crystal-nematic transition temperature of $-40°$ to $-20°$ C and a nematic-isotropic transition temperature of 50° to 65° C.

2 Claims, 4 Drawing Figures

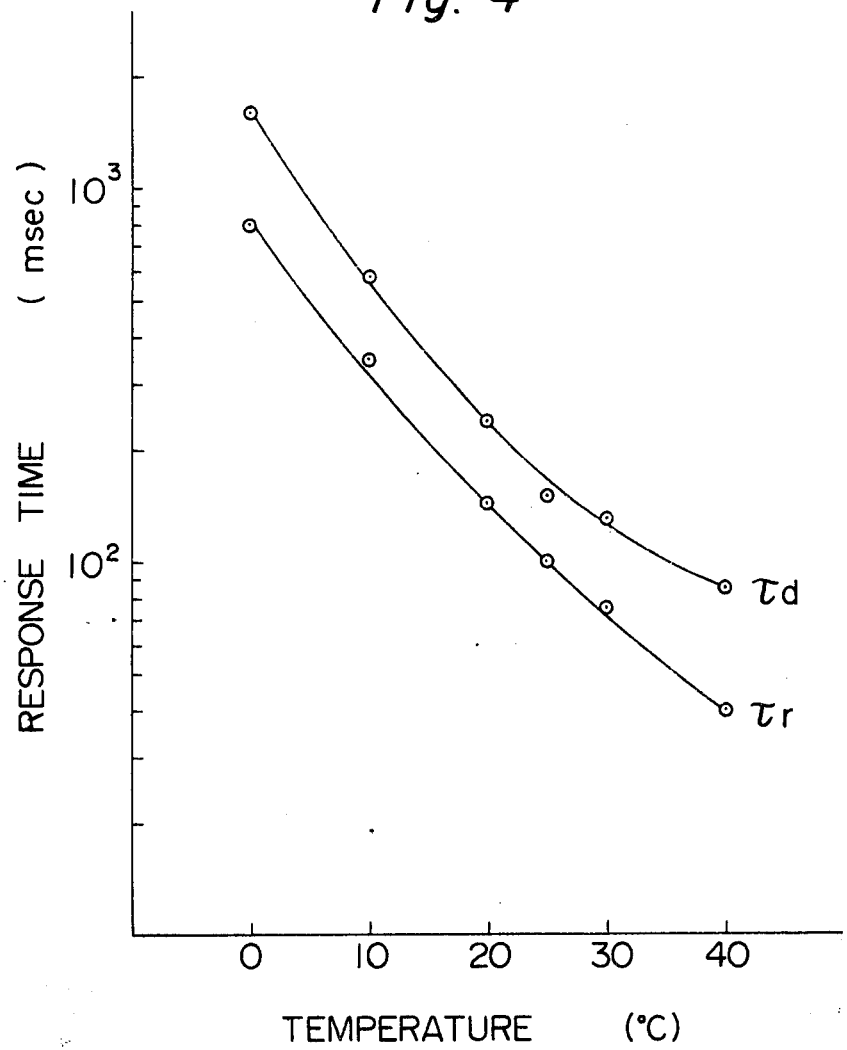

NEMATIC LIQUID CRYSTAL COMPOSITION

This invention relates to a nematic liquid crystal composition, and specifically, to a nematic liquid crystal composition which has superior properties in regard, for example, to liquid crystal temperature range, threshold voltage, response speed, and life, and exhibits positive dielectric anisotropy.

As is well known, nematic liquid crystalline substances have attracted attention as display materials because their optical properties change markedly in an electric field, and they are under active research and development.

From the standpoint of dielectric properties, the nematic liquid crystalline substances are classified into those showing positive dielectric anisotropy and those showing negative dielectric anisotropy. The nematic liquid crystalline substances showing positive dielectric anisotropy have an electric dipole approximately parallel to the long axes of the molecules, and upon the application of an electric field, it causes the long axes of the molecules to be aligned parallel to the direction of the electric field. The nematic liquid crystalline substances showing negative dielectric anisotropy, on the other hand, have an electric dipole nearly perpendicular to the long axes of the molecules, and upon the application of an electric field, it causes the long axes of the molecules to be aligned perpendicular to the direction of the electric field. Since the molecular alignment of the nematic liquid crystalline substances in an electric field differs according to the difference in dielectric anisotropy, their dielectric anisotropy is positive or negative. Generally, nematic liquid crystalline substances showing negative dielectric anisotropy are operated by a Dynamic Scattering Mode, and nematic liquid crystalline substances showing positive anisotropy are operated by a Field Effect Mode.

These two methods of display have their own merits and demerits. Since the Field Effect Mode can be performed at a lower operating voltage with far smaller electric power consumption than the Dynamic Scattering Mode, it can be utilized especially effectively in display devices for wrist watches which have a limited electric source.

When a nematic liquid crystalline substance is enclosed between two electrodes whose surfaces have been strongly rubbed in a given direction, the liquid crystalline molecules are oriented with their long axes in the rubbing direction. Accordingly, when a nematic liquid crystalline substance is enclosed in a cell in which two electrodes are arranged in parallel to each other with their rubbing directions being at right angles to each other, the liquid crystalline molecules form a helical arrangement in which the orienting directions of the molecules are twisted by 90° continuously between the two electrodes. Thus, the liquid crystalline layer has the ability to rotate the plane of the polarized light to 90° with respect to the angle of incidence. Where the nematic liquid crystalline substance sealed in the cell has positive dielectric anisotropy, the application of an electric field causes the liquid crystalline molecules to be oriented such that their long axes are aligned perpendicular to the electrode surfaces. Consequently, the helical arrangement is destroyed, and the rotating ability of the liquid crystalline layer is lost. When such a liquid crystal cell is held by two polarizing plates whose light polarizing surfaces cross each other at right angles, the light is shut off at a portion to which an electric field has been applied, but passes through a portion to which the electric field has not been applied. The display method utilizing this theory is called a Field Effect Mode, and is employed in liquid crystal display devices. This method of display is described in detail in M. Schadt et al., APPLIED PHYSICS LETTERS, Vol. 18, pages 127-128 (1971).

Benzylideneaniline compounds, azoxybenzylidene compounds, benzoic acid phenyl ester compounds and biphenyl compounds, and certain mixtures of the foregoing compounds, for example, have been known as nematic liquid crystalline materials which show positive dielectric anisotropy. These nematic liquid crystalline materials of the prior art, however, have the defect that the temperature at which they form a nematic mesophase is high, and the threshold voltage is also high. Nematic liquid crystalline materials which have positive dielectric anisotropy and which form a stable nematic mesophase over a broad temperature range including room temperature and show a threshold voltage of not more than 1 V have not yet been known.

It is an object of this invention therefore to provide a nematic liquid crystalline material which has positive dielectric anisotropy and which forms a stable nematic mesophase over a broad temperature range including room temperature, particularly at room temperature or even at lower temperatures, and shows a threshold voltage of not more than 1 V.

We have found that a composition comprising the following four compounds, (I), (II), (III) and (IV), or (I), (II), (III) and (V), as essential ingredients, and having a crystal-nematic transition temperature of −40° to −20° C and nematic-isotropic transition temperature of 50° to 65° C is a nematic liquid crystalline material which suits the above objects.

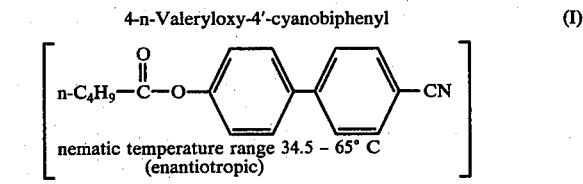

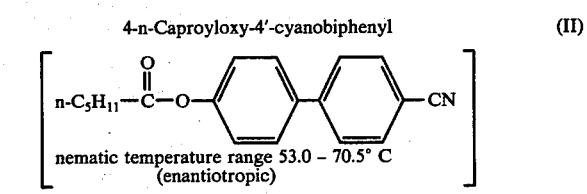

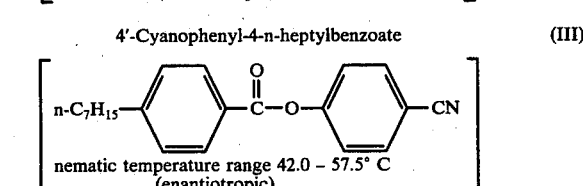

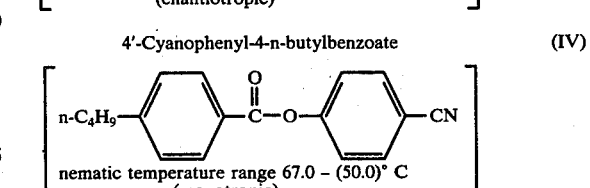

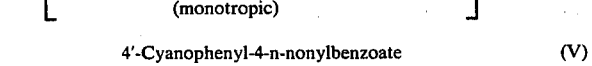

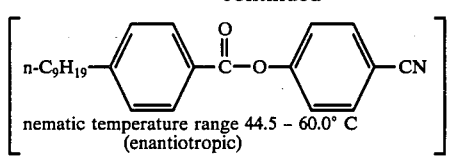

nematic temperature range 44.5 – 60.0° C
(enantiotropic)

The present invention, therefore, provides a four-component nematic liquid crystal composition comprising three compounds, 4-n-valeryloxy-4'-cyanobiphenyl (I), 4-n-caproyloxy-4'-cyanobiphenyl (II) and 4'-cyanophenyl-4-n-heptylbenzoate (III), and either 4'-cyanophenyl-4-n-butylbenzoate (IV) or 4'-cyanophenyl-4-n-nonylbenzoate (V), and having a crystal-nematic transition temperature of −40° to −20° C and a nematic-isotropic transition temperature of 50° to 65° C.

One preferred nematic liquid crystal composition of this invention is a composition consisting of 5 to 70 mole% of compound (I), 5 to 40 mole% of compound (II), 5 to 60 mole% of compound (III), and 5 to 45 mole% of compound (IV). This nematic liquid crystal composition has a crystal-nematic transition temperature of −40° to −25° C and a nematic-isotropic transition temperature of 50° to 65° C. A liquid crystal display cell of the Field Effect Mode having this nematic liquid crystal composition filled therein with a liquid crystal layer thickness of 10 to 25 microns shows a threshold voltage of 0.7 to 1.0 V when an a.c. voltage with a frequency of 30 hertz to 10 kilohertz is applied thereto at a temperature of 0° to 40° C.

Another preferred nematic liquid crystal composition of this invention is a composition consisting of 20 to 45 mole% of compound (I), 5 to 30 mole% of compound (II), 20 to 45 mole% of compound (III) and 5 to 30 mole% of compound (V). This nematic liquid crystal composition has a crystal-nematic transition temperature of −30° to −20° C and a nematic-isotropic transition temperature of 50° to 60° C. A liquid crystal display cell of the Field Effect Mode having this nematic liquid crystal composition filled therein with a liquid crystal layer thickness of 10 to 50 microns shows a threshold voltage of 0.6 to 1.0 V when an a.c. voltage with a frequency of 30 hertz to 10 kilohertz is applied at a temperature of 0° to 40° C.

Since the nematic liquid crystal compositions of this invention form a stable nematic mesophase over a broad temperature range including room temperature and show a threshold voltage of not more than 1 V, display devices using the nematic liquid crystal compositions of this invention can be sufficiently operated at a voltage of as low as about 3 V both indoors and outdoors irrespective of whether in cold or warm climates.

The compounds (I) to (V) used as nematic crystalline substances in the present invention can be produced, for example, by the following methods.

(1) Preparation of 4-n-valeryloxy-4'-cyanobiphenyl and 4-n-caproyloxy-4'-cyanobiphenyl:

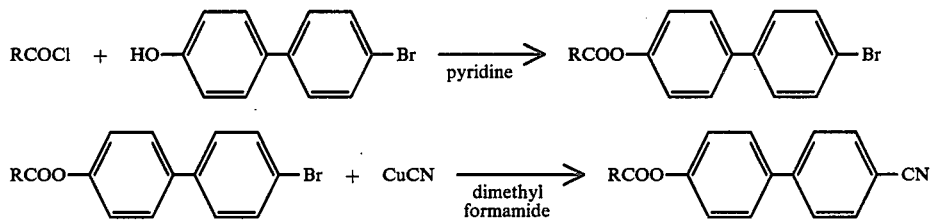

The corresponding acyl chloride is reacted with 4-hydroxy-4'-bromobiphenyl in pyridine, and the reaction mixture is poured into water to precipitate the reaction product. The product is collected by filtration, washed with water, and recrystallized from benzene to afford 4-acyloxy-4'-cyanobiphenyl. Then, the 4-acyloxy-4'-cyanobiphenyl is reacted with cuprous cyanide in dimethyl formamide, and the reaction mixture is treated with an aqueous solution of hydrochloric acid containing ferric chloride to precipitate the reaction product. The product is collected by filtration, extracted with benzene, and recrystallized from benzene to afford 4-acyloxy-4'-cyanobiphenyl.

The 4-hydroxy-4'-bromobiphenyl used in the above reaction can be prepared by the following process.

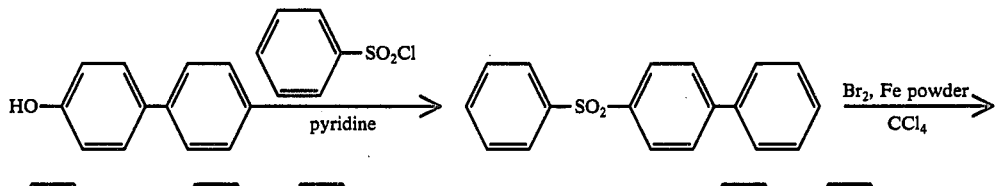

(2) Preparation of 4'-cyanophenyl-4-n-butylbenzoate, 4'-cyanophenyl-4-n-heptylbenzoate and 4'-cyanophenyl-4-n-nonylbenzoate:

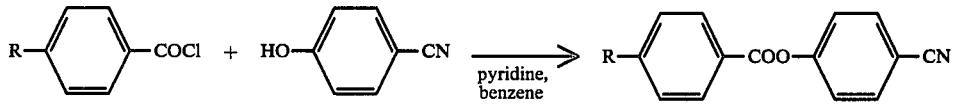

The corresponding p-alkylbenzoyl chloride is reacted with p-cyanophenol in a mixture of pyridine and benzene. The reaction product is washed with water, and benzene is distilled off. The residue is recrystallized from hexane to afford the 4-cyanophenyl-4-alkylbenzoate.

The invention will now be illustrated specifically by the following Examples by reference to the accompanying drawings which show the display characteristics of the nematic liquid crystal compositions of this invention.

Figure 3:
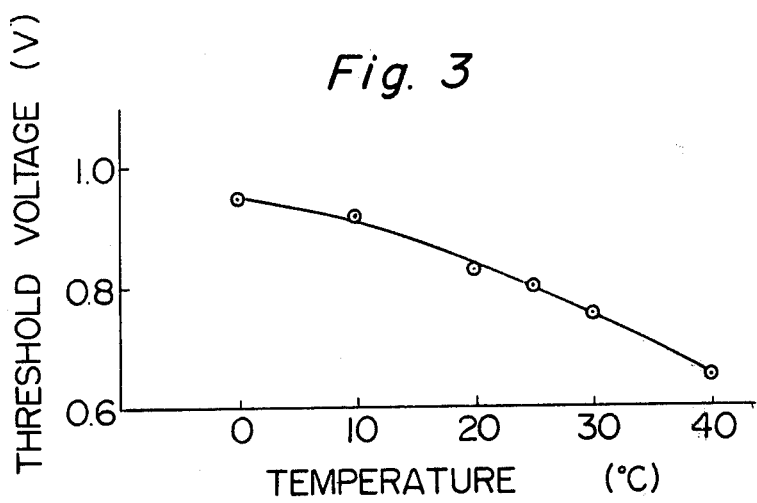
Figure 2:
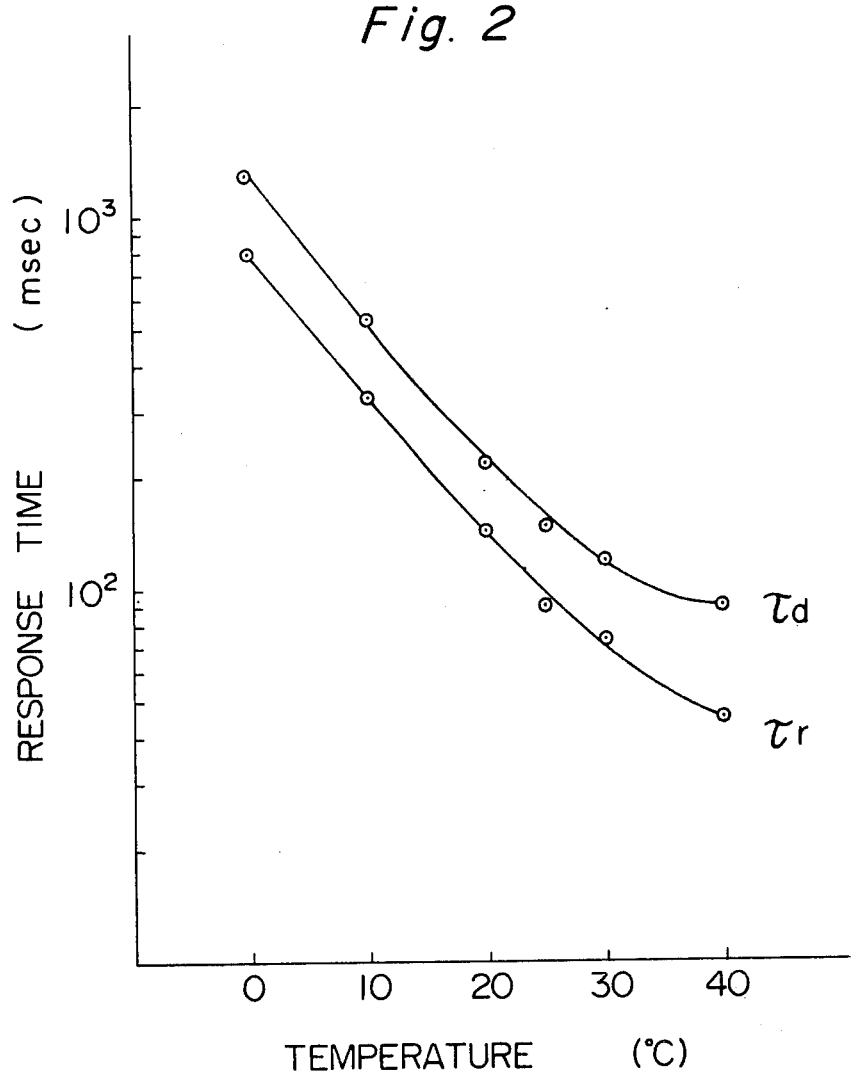

FIGS. 1 and 3 are graphs showing changes in threshold voltage in accordance with the Field Effect Mode versus changes in temperature; and FIGS. 2 and 4 are graphs showing changes in response speed in accordance with the Field Effect Mode versus changes in temperature.

EXAMPLE 1

Various nematic liquid crystal compositions were prepared by mixing compounds (I), (II), (III) and (IV) in the mixing ratios shown in Table 1. The transition temperatures of these compositions were measured, and the results are shown in Table 1.

In Table 1, (I) refers to 4-n-valeryloxy-4′-cyanobiphenyl; (II), to 4-n-caproyloxy-4′-cyanobiphenyl; (III), to 4′-cyanophenyl-4-n-heptylbenzoate; and (IV), to 4′-cyanophenyl-4-n-butylbenzoate. Furthermore, $T_{C \to N}$ represents a temperature of transition from a crystal phase to a nematic mesophase; $T_{N \to C}$, a temperature of transition from a nematic mesophase to a crystal phase; $T_{N \to I}$, a temperature of transition from a nematic mesophase to an isotropic phase; and $T_{I \to N}$, a temperature of transition from an isotropic phase to a nematic phase.

The measurement of $T_{C \to N}$ and $T_{N \to I}$ was carried out by sufficiently cooling a sample filled in a capillary to crystallize it, and observing the phase transition by an optical microscope while heating it at a rate of 1° C/3 minutes. The measurement of $T_{N \to C}$ and $T_{I \to N}$ was performed by sufficiently heating a sample filled in a capillary to liquefy it, and observing the phase transition by an optical microscope while cooling it at a rate of 1° C/3 minutes.

Table 1

| Composition No. | Mixing ratio (mole %) | | | | Transition temperature (° C) | | |
|---|---|---|---|---|---|---|---|
| | (I) | (II) | III | (IV) | $T_N \rightleftarrows I$ | $T_N \to C$ | $T_C \to N$ |
| 1 | 5 | 23 | 50 | 22 | 57.0 | −36.0 | −31 |
| 2 | 10 | 22 | 46 | 22 | 57.5 | −37.0 | −31 |
| 3 | 15 | 18 | 37 | 30 | 55.0 | −37.0 | −32.5 |
| 4 | 15 | 30 | 37 | 18 | 58.5 | −37.5 | −32.0 |
| 5 | 18 | 15 | 30 | 37 | 54.0 | −38.0 | −31.5 |
| 6 | 18 | 37 | 30 | 15 | 60.0 | −36.0 | −30.5 |
| 7 | 17 | 17 | 33 | 33 | 55.0 | −37.0 | −32.0 |
| 8 | 22 | 12 | 22 | 44 | 53.5 | −35.0 | −29.0 |
| 9 | 22 | 22 | 28 | 28 | 55.5 | −38.0 | −33.0 |
| 10 | 22 | 22 | 34 | 22 | 57.0 | −35.0 | −31.0 |
| 11 | 22 | 34 | 22 | 22 | 59.0 | −36.0 | −30.0 |
| 12 | 22 | 22 | 22 | 34 | 55.0 | −36.0 | −28.0 |
| 13 | 24 | 24 | 26 | 26 | 56.5 | −35.0 | −31.0 |
| 14 | 25 | 25 | 25 | 25 | 57.0 | −36.0 | −30.5 |
| 15 | 26 | 26 | 24 | 24 | 57.5 | −35.0 | −30.0 |
| 16 | 26 | 24 | 26 | 24 | 57.0 | −37.0 | −31.0 |
| 17 | 28 | 28 | 22 | 22 | 58.0 | −36.0 | −32.0 |
| 18 | 30 | 15 | 18 | 37 | 54.5 | −36.0 | −29.0 |
| 19 | 30 | 37 | 18 | 15 | 59.5 | −37.0 | −30.0 |
| 20 | 32 | 31 | 32 | 5 | 60.5 | −38.0 | −33.0 |
| 21 | 33 | 17 | 17 | 33 | 54.5 | −36.0 | −30.5 |
| 22 | 33 | 33 | 17 | 17 | 60.0 | −35.0 | −31.0 |
| 23 | 34 | 22 | 22 | 22 | 57.5 | −36.0 | −31.0 |
| 24 | 37 | 18 | 15 | 30 | 56.5 | −38.0 | −31.0 |
| 25 | 37 | 30 | 15 | 18 | 59.0 | −36.0 | −29.5 |
| 26 | 43 | 5 | 43 | 9 | 58.5 | −38.0 | −31.0 |
| 27 | 44 | 22 | 12 | 22 | 58.5 | −37.0 | −29.0 |
| 28 | 45 | 40 | 15 | 10 | 61.0 | −37.0 | −31.0 |
| 29 | 64 | 12 | 12 | 12 | 59.5 | −29.0 | −26.0 |

EXAMPLE 2

A transparent conductive layer of indium oxide was formed on one surface of each of two glass sheets, and the top of each conductive layer was strongly rubbed in one direction. Cells were built by disposing the two glass sheets at a distance of 10 microns from each other so that the conductive layers faced each other, and their directions of rubbing crossed each other at right angles. The nematic liquid crystal compositions Nos. 3, 14, 17 and 24 shown in Table 1 were each filled in the resulting cells to form liquid crystal display cells.

The threshold voltages and response speeds of these cells were measured when an a.c. voltage with a frequency of 32 hertz was applied at 25° C to the transparent conductive layer of each cell. The results are shown in Table 2. The response speeds were measured at an impressing voltage of 3 V.

Table 2

| Composition No. | Threshold Voltage (V) | Response speed (msec) | |
|---|---|---|---|
| | | Rise time | Decay time |
| 3 | 0.80 | 90 | 200 |
| 14 | 0.85 | 80 | 120 |
| 17 | 0.90 | 80 | 120 |
| 24 | 0.85 | 100 | 150 |

When a given voltage is applied to a liquid crystal display cell at a given temperature, the intensity of a transmitting light through the liquid crystal display cell decays with time, and finally converges to a certain constant value. Let this converged value be the intensity of transmitting light under the application of voltage. Then the response speed is defined as follows: The response speed is expressed in terms of the rise time ($\tau r$) and the decay time ($\tau d$). The rise time ($\tau r$) is defined as the time required until the intensity of transmitting light, after the application of voltage, decays 90% of the difference between the intensity of transmitting light in the absence of voltage application and the intensity of transmitting light under the application of voltage. The decay time (τd) is defined as the time required after the shutting off of the voltage, the intensity of transmitting light is restored to 90% of the difference between the intensity of transmitting light in the absence of voltage application and the intensity of transmitting light under the application of voltage.

When various voltages are applied to a liquid crystal display cell at a given temperature, the intensity of transmitting light through the cell decays with an increase in voltage, and converges to a constant value. The threshold voltage is defined as the impressing voltage which gives the intensity of transmitting light that has decayed from the intensity of transmitting light in the absence of voltage application by 10% of the difference between it and the converged value.

compositions shown in Table 3 were measured. The results are shown in Table 3.

In Table 3, (I), (II) and (III) represent the compounds (I), (II) and (III) in Example 1. (V) represents 4'-cyanophenyl-4-n-nonylbenzoate. The threshold voltages and response speeds were measured under the same conditions as in Example 2 using the same cells as in Example 2.

Table 3

| Composition No. | Mixing ratio (mole %) | | | | Transition temperature (° C) | | | Threshold voltage (V) | Response speed (msec) | |
| --- | --- | --- | --- | --- | --- | --- | --- | --- | --- | --- |
| | (I) | (II) | (III) | (V) | $T_N \rightleftarrows I$ | $T_N \rightarrow C$ | $T_C \rightarrow N$ | | Rise time | Decay time |
| 30 | 25 | 25 | 25 | 25 | 58.5 | −20.0 | −19.0 | 0.8 | 100 | 150 |
| 31 | 25 | 25 | 40 | 10 | 58.8 | −21.0 | −20.1 | 0.8 | 90 | 160 |
| 32 | 40 | 10 | 25 | 25 | 57.3 | −29.0 | −20.0 | 0.8 | 120 | 180 |
| 33 | 40 | 10 | 40 | 10 | 58.4 | −29.0 | −24.0 | 0.8 | 90 | 150 |

EXAMPLE 3

An a.c. voltage with a frequency of 32 hertz was applied at varying temperatures to the transparent conductive layer of the liquid crystal cell used in Example 2 which contained the nematic liquid crystal composition No. 17, and the threshold voltage and response speed were measured. The results are shown in FIGS. 1 and 2. The response speed was measured at an impressing voltage of 3 V.

EXAMPLE 4

The transition temperatures, threshold voltages and response speeds of the various nematic liquid crystal

EXAMPLE 5

An a.c. voltage with a frequency of 32 hertz was applied at varying temperatures to the transparent conductive layer of the liquid cell used in Example 4 which contained the nematic liquid crystal composition No. 30 shown in Table 2, and the threshold voltage and response speed were measured. The results are shown in FIGS. 3 and 4. The response speed was measured at an impressing voltage of 3 V.

What we claim is:

1. A nematic liquid crystal composition comprising 5 to 70 mole% of (I) 4-n-valeryloxy-4'-cyanobiphenyl, 5 to 40 mole% of (II) 4-n-caproyloxy-4'-cyanobiphenyl, 5 to 60 mole% of (III) 4'-cyanophenyl-4-n-heptylbenzoate, and 5 to 45 mole% of (IV) 4'-cyanophenyl-4-n-butylbenzoate.

2. A nematic liquid crystal composition comprising 20 to 45 mole% of (I) 4-n-valeryloxy-4'-cyanobiphenyl, 5 to 30 mole% of (II) 4-n-caproyloxy-4'-cyanobiphenyl, 20 to 45 mole% of (III) 4'-cyanophenyl-4-n-heptylbenzoate, and 5 to 30 mole% of (V) 4'-cyanophenyl-4-n-nonylbenzoate.

* * * * *